(12) United States Patent
Eble et al.

(10) Patent No.: US 10,832,427 B1
(45) Date of Patent: Nov. 10, 2020

(54) SCENE CAMERA RETARGETING

(71) Applicant: Apple Inc., Cupertino, CA (US)

(72) Inventors: Tobias Eble, Sunnyvale, CA (US); Thomas Post, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 87 days.

(21) Appl. No.: 16/364,621

(22) Filed: Mar. 26, 2019

Related U.S. Application Data

(60) Provisional application No. 62/667,737, filed on May 7, 2018.

(51) Int. Cl.
| | |
|---|---|
| *G06T 7/50* | (2017.01) |
| *G06T 7/536* | (2017.01) |
| *G02B 27/01* | (2006.01) |
| *G02B 27/00* | (2006.01) |
| *G06T 19/00* | (2011.01) |
| *G06F 3/01* | (2006.01) |
| *G06F 17/16* | (2006.01) |

(52) U.S. Cl.
CPC .......... *G06T 7/536* (2017.01); *G02B 27/0093* (2013.01); *G02B 27/0172* (2013.01); *G06F 3/013* (2013.01); *G06F 3/017* (2013.01); *G06F 17/16* (2013.01); *G06T 19/006* (2013.01); *G02B 2027/0138* (2013.01); *G06T 2207/10028* (2013.01)

(58) Field of Classification Search
CPC ............... G06T 7/536; G06T 19/006; G06T 2207/10028; G06F 3/017; G06F 3/013; G06F 17/16; G02B 27/0172; G02B 27/0093; G02B 2027/0138
See application file for complete search history.

(56) References Cited

U.S. PATENT DOCUMENTS

| | | | |
|---|---|---|---|
| 7,312,766 B1 | 12/2007 | Edwards | |
| 8,576,276 B2 | 11/2013 | Bar-Zeev et al. | |
| 9,652,893 B2 | 5/2017 | Michail et al. | |
| 9,858,673 B2* | 1/2018 | Ciurea | H04N 9/097 |
| 2017/0177082 A1* | 6/2017 | Michail | G02B 27/0172 |
| 2017/0205892 A1* | 7/2017 | Petrovskaya | G06T 19/006 |

OTHER PUBLICATIONS

Joan Sol Roo and Martin Hachet. Oct. 2017. One Reality: Augmenting How the Physical World is Experienced by combining Multiple Mixed Reality Modalities. In Proceedings of the 30th Annual ACM Symposium on User Interface Software and Technology (UIST '17). Association for Computing Machinery, New York, NY, USA.*

* cited by examiner

*Primary Examiner* — Neil R McLean
(74) *Attorney, Agent, or Firm* — Fernando & Partners, LLP

(57) ABSTRACT

In one implementation, a method of scene camera retargeting is performed by a head-mounted device (HMD) including one or more processors, non-transitory memory, a scene camera, and a display. The method includes capturing, using the scene camera, an image of a scene. The method includes determining, using the one or more processors, a depth of the scene. The method further includes transforming, using the one or more processors, the image of the scene based on the depth and a difference between a point-of-view of the scene camera and a point-of-view of a user. The method further includes displaying, on the display, the transformed image.

20 Claims, 7 Drawing Sheets

SCENE CAMERA RETARGETING

CROSS-REFERENCE TO RELATED APPLICATIONS

This application claims priority to U.S. Provisional Patent App. No. 62/667,737, filed on May 7, 2018, which is hereby incorporated by reference in its entirety.

TECHNICAL FIELD

The present disclosure generally relates to scene camera retargeting, and in particular, to systems, methods, and devices for scene camera retargeting based on a planar world assumption.

BACKGROUND

To generate a virtual environment, computing devices typically completely project or partially superimpose computer-generated images on a user's view. A virtual environment can be based on different types of realities. A virtual environment based on virtual reality (VR) can be a computer-simulated environment that can simulate a user's physical presence within the computer-simulated environment and, optionally, correspondingly simulate some or all of the user's physical movements within the computer-simulated environment. A virtual environment based on VR can be immersive and perceptually can completely replace the user's physical environment. For example, VR environments can utilize (spatial) audio, haptics, etc. in addition to computer-generated images to enhance the realism of the experience. A virtual environment based on augmented virtuality (AV) can include elements of the real world, or representations thereof, combined with or superimposed over a user's view of a computer-simulated environment (e.g., via a display that displays a computer-simulated environment). A virtual environment based on augmented reality (AR) can include one or more computer-generated images or objects that are superimposed over a user's direct (e.g., through a transparent glass display) or indirect (e.g., via a display that displays the real world captured by a camera sensor) view of the real world. The phrase mixed reality (MR) is sometimes used to describe the spectrum of virtual environments spanning from VR to AR. A virtual environment based on MR thus can include elements from both the real environment and the virtual environment to create a hybrid environment where elements of the real world, such as those captured using a camera sensor, are displayed in a computer-simulated environment.

HMDs are often used to experience these virtual environments. Various HMDs include a scene camera that captures an image of the environment of the user (e.g., a scene) and a display that displays the image to the user. In some instances this image or portions thereof can be combined with one or more virtual objects to present the user with an AR experience. In other instances, the HMD can operate in a pass-through mode in which the image or portions thereof are presented to the user without the addition of virtual objects. Ideally, the image of the real world presented to the user is substantially similar to what the user would see if the HMD were not present. However, due to the different positions of the eyes, the display, and the camera in space, this may not occur, resulting in impaired distance perception, disorientation, and poor hand-eye coordination.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
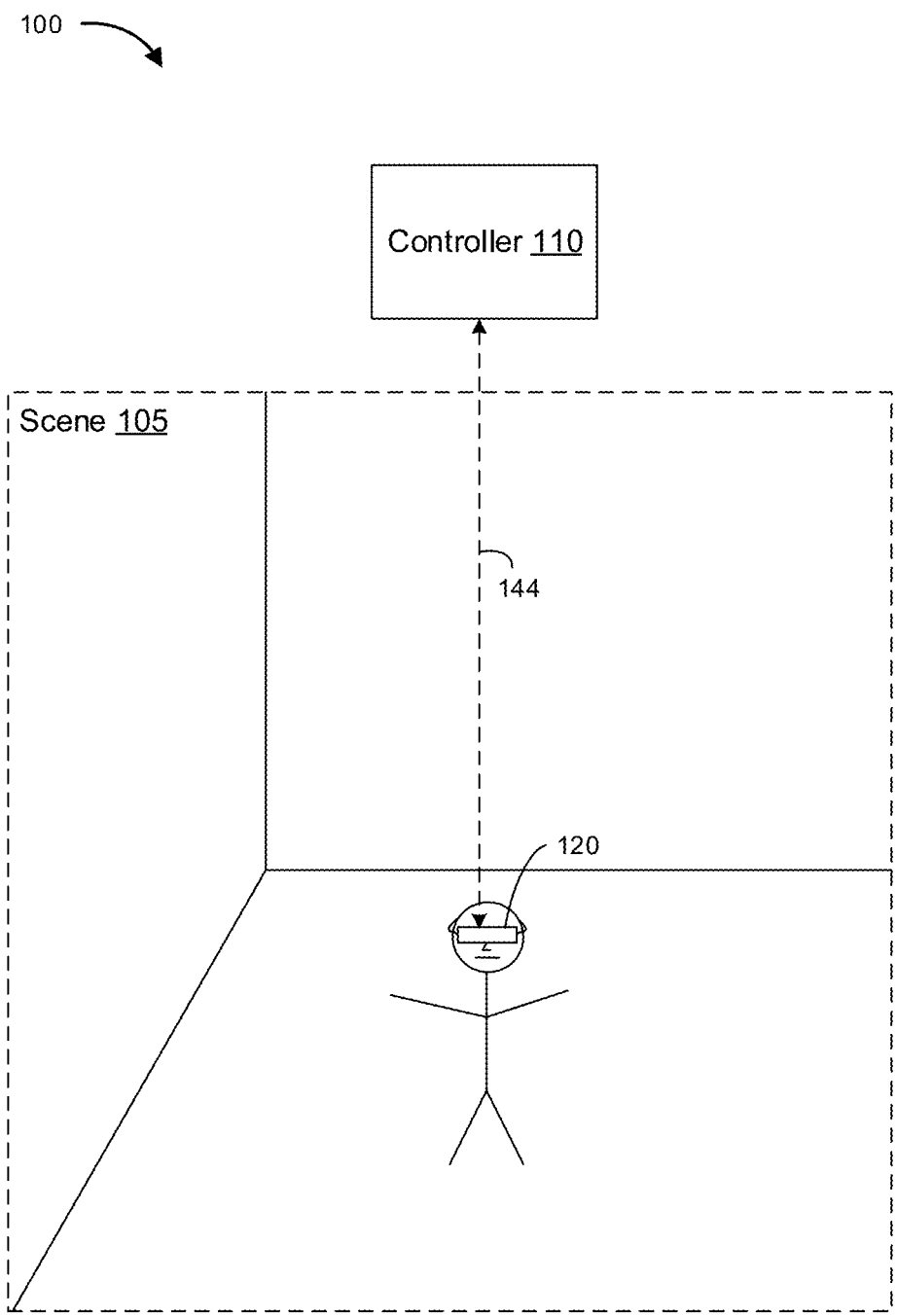
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for scene camera retargeting. In various implementations, the method is performed at an HMD including one or more processors, non-transitory memory, a scene camera, and a display. The method includes capturing, using the scene camera, an image of a scene. The method includes determining, using the one or more processors, a depth of the scene. The method further includes transforming, using the one or more processors, the image of the scene based on the depth and a difference between a point-of-view of the scene camera and a point-of-view of a user. The method includes displaying, on the display, the transformed image.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

As described above, in an HMD with a display and a scene camera, the image of the real world presented to the user on the display may not always reflect what the user would see if the HMD were not present due to the different positions of the eyes, the display, and the camera in space. In various circumstances, this results in poor distance perception, disorientation of the user, and poor hand-eye coordination, e.g., while interacting with the real world.

However, in various implementations, compensation for the different positions of the eyes, the display, and the camera is performed by transforming the image captured by the scene camera to make it appear as though it were captured at the same location as the eyes of the user (e.g., to make the captured image appear as though the user were viewing the scene while not wearing the HMD). One form of compensation is based on a planar world assumption: that the real world is an image at a single depth (e.g., a distance from the HMD). In various implementations, this depth is determined in various ways as detailed below. Homography on the image performed under this assumption may provide good results with respect to pixels corresponding to objects at this depth, but may introduce distortion to other pixels in an amount proportional to the difference in the assumed depth and actual depth.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an HMD 120.

In some implementations, the controller 110 is configured to manage and coordinate an MR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the scene 105. For example, the controller 110 is a local server located within the scene 105. In another example, the controller 110 is a remote server located outside of the scene 105 (e.g., a cloud server, central server, etc.). In some implementations, the controller 110 is communicatively coupled with the HMD 120 via one or more wired or wireless communication channels 144 (e.g., BLUETOOTH, IEEE 802.11x, IEEE 802.16x, IEEE 802.3x, etc.). In another example, the controller 110 is included within the enclosure of HMD 120.

In some implementations, the HMD 120 is configured to provide the MR experience to the user. In some implementations, the HMD 120 includes a suitable combination of software, firmware, and/or hardware. The HMD 120 is described in greater detail below with respect to FIG. 3. In some implementations, the functionalities of the controller 110 are provided by and/or combined with the HMD 120.

According to some implementations, the HMD 120 provides an MR experience to the user while the user is virtually and/or physically present within the scene 105. In some implementations, while presenting an AR experience, the HMD 120 is configured to present AR content (e.g., one or more virtual objects) and to enable optical see-through of the scene 105. In some implementations, while presenting an AR experience, the HMD 120 is configured to present AR content (e.g., one or more virtual objects) overlaid or otherwise combined with images or portions thereof captured by the scene camera of HMD 120. In some implementations, while presenting AV content, the HMD 120 is configured to present elements of the real world, or representations thereof, combined with or superimposed over a user's view of a computer-simulated environment. In some implementations, while presenting a VR experience, the HMD 120 is configured to present VR content.

In some implementations, the user wears the HMD 120 on his/her head. As such, the HMD 120 includes one or more MR displays provided to display the MR content. For example, in various implementations, the HMD 120 encloses the field-of-view of the user. In some implementations, the HMD 120 is replaced with a handheld device (such as a smartphone or tablet) configured to present MR content, and rather than wearing the HMD 120 the user holds the device with a display directed towards the field-of-view of the user and a camera directed towards the scene 105. In some implementations, the handheld device can be placed within an enclosure that can be worn on the head of the user. In some implementations, the HMD 120 is replaced with an MR chamber, enclosure, or room configured to present MR content in which the user does not wear or hold the HMD 120.

Figure 2:
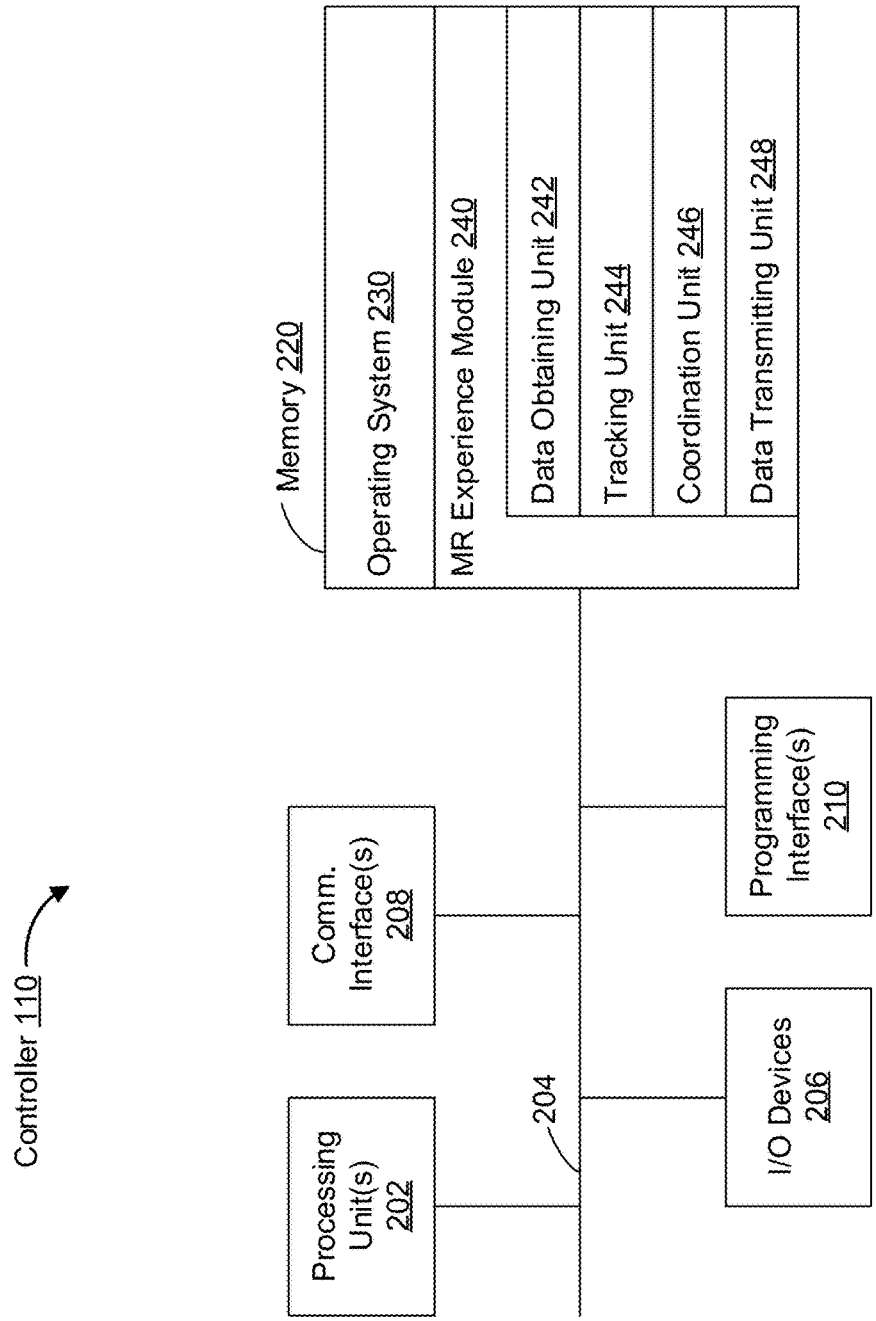
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an MR experience module 240.

The operating system 230 includes procedures for handling various basic system services and for performing hardware dependent tasks. In some implementations, the MR experience module 240 is configured to manage and coordinate one or more MR experiences for one or more users (e.g., a single MR experience for one or more users, or multiple MR experiences for respective groups of one or more users). To that end, in various implementations, the MR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the HMD 120. To that end, in various implementations, the data obtaining unit 242 includes instructions and/or logic therefor, and heuristics and metadata therefor.

In some implementations, the tracking unit 244 is configured to map the scene 105 and to track the position/location of at least the HMD 120 with respect to the scene 105. To that end, in various implementations, the tracking unit 244 includes instructions and/or logic therefor, and heuristics and metadata therefor.

In some implementations, the coordination unit 246 is configured to manage and coordinate the MR experience presented to the user by the HMD 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the HMD 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
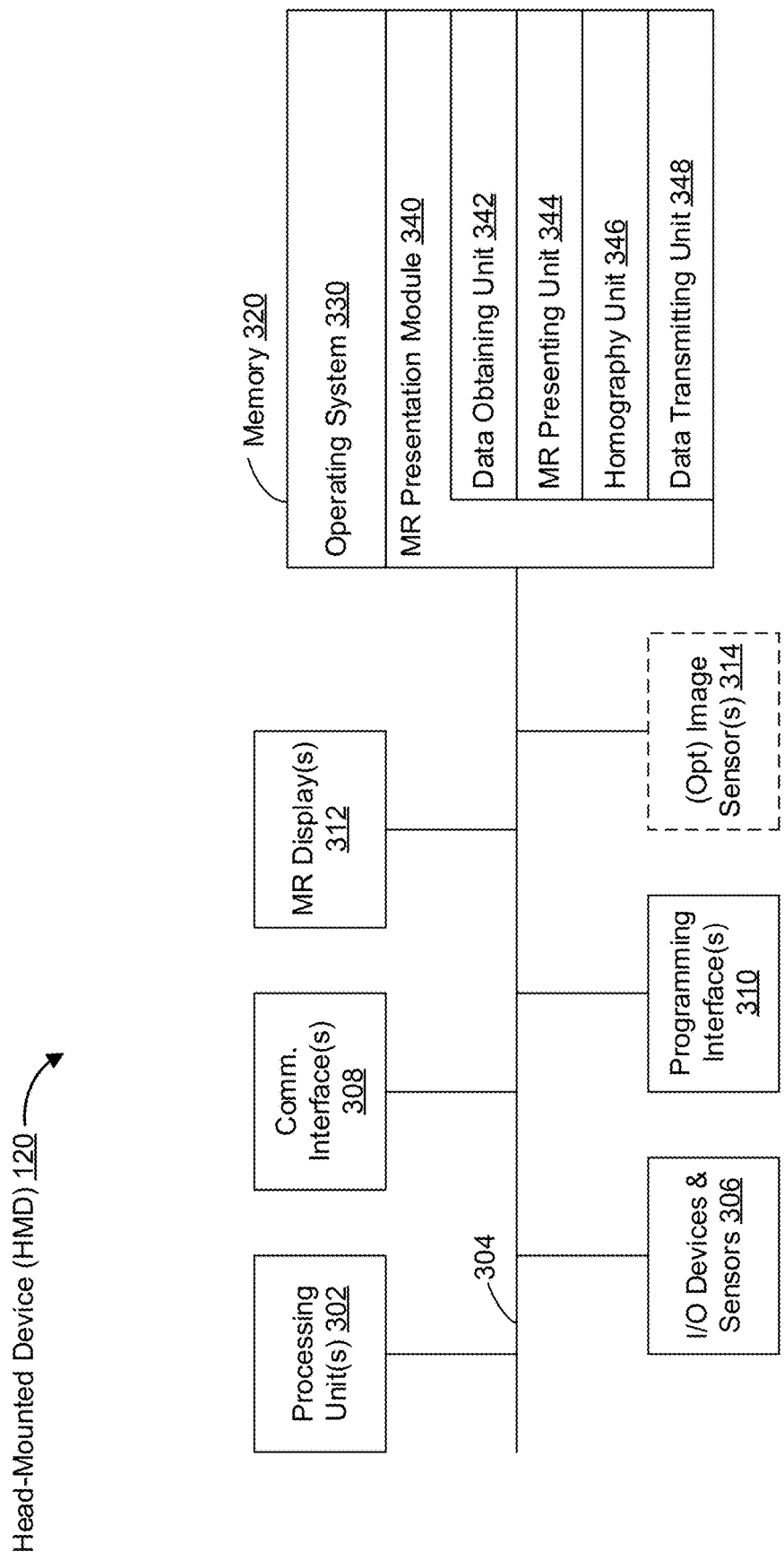
FIG. 3 is a block diagram of an example HMD in accordance with some implementations.

FIG. 3 is a block diagram of an example of the HMD 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the HMD 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more MR displays 312, one or more optional interior and/or exterior facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), and/or the like.

In some implementations, the one or more MR displays 312 are configured to provide the MR experience to the user. In some implementations, the one or more MR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more MR displays 312 correspond to diffractive, reflective, polarized, holographic, etc. waveguide displays. For example, the HMD 120 includes a single MR display. In another example, the HMD 120 includes an MR display for each eye of the user. In some implementations, the one or more MR displays 312 are capable of presenting AR and VR content. In some implementations, the one or more MR displays 312 are capable of presenting AR or VR content.

In some implementations, the one or more optional image sensors 314 are configured to obtain image data that corresponds to at least a portion of the face of the user that includes the eyes of the user. In some implementations, the one or more optional image sensors 314 are configured to be forward-facing so as to obtain image data that corresponds to the scene as would be viewed by the user if the HMD 120 was not present. The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an MR presentation module 340.

The operating system 330 includes procedures for handling various basic system services and for performing hardware dependent tasks. In some implementations, the MR presentation module 340 is configured to present MR content to the user via the one or more MR displays 312. To that end, in various implementations, the MR presentation module 340 includes a data obtaining unit 342, an MR presenting unit 344, a homography unit 346, and a data transmitting unit 348.

In some implementations, the data obtaining unit 342 is configured to obtain data (e.g., presentation data, interaction data, sensor data, location data, etc.) from at least the controller 110. To that end, in various implementations, the data obtaining unit 342 includes instructions and/or logic therefor, and heuristics and metadata therefor.

In some implementations, the MR presenting unit 344 is configured to present MR content via the one or more MR displays 312. To that end, in various implementations, the MR presenting unit 344 includes instructions and/or logic therefor, and heuristics and metadata therefor.

In some implementations, the homography unit 346 is configured to transform an image of the scene (e.g., captured using a scene camera of the one or more optional image sensors 314) based on a depth of the scene and a difference between a point-of-view of the scene camera and a point-of-view of a user. To that end, in various implementations, the homography unit 346 includes instructions and/or logic therefor, and heuristics and metadata therefor.

In some implementations, the data transmitting unit 348 is configured to transmit data (e.g., presentation data, location data, etc.) to at least the controller 110. To that end, in various implementations, the data transmitting unit 348 includes instructions and/or logic therefor, and heuristics and metadata therefor.

Although the data obtaining unit 342, the MR presenting unit 344, the homography unit 346, and the data transmitting unit 348 are shown as residing on a single device (e.g., the HMD 120), it should be understood that in other implementations, any combination of the data obtaining unit 342, the MR presenting unit 344, the homography unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4:
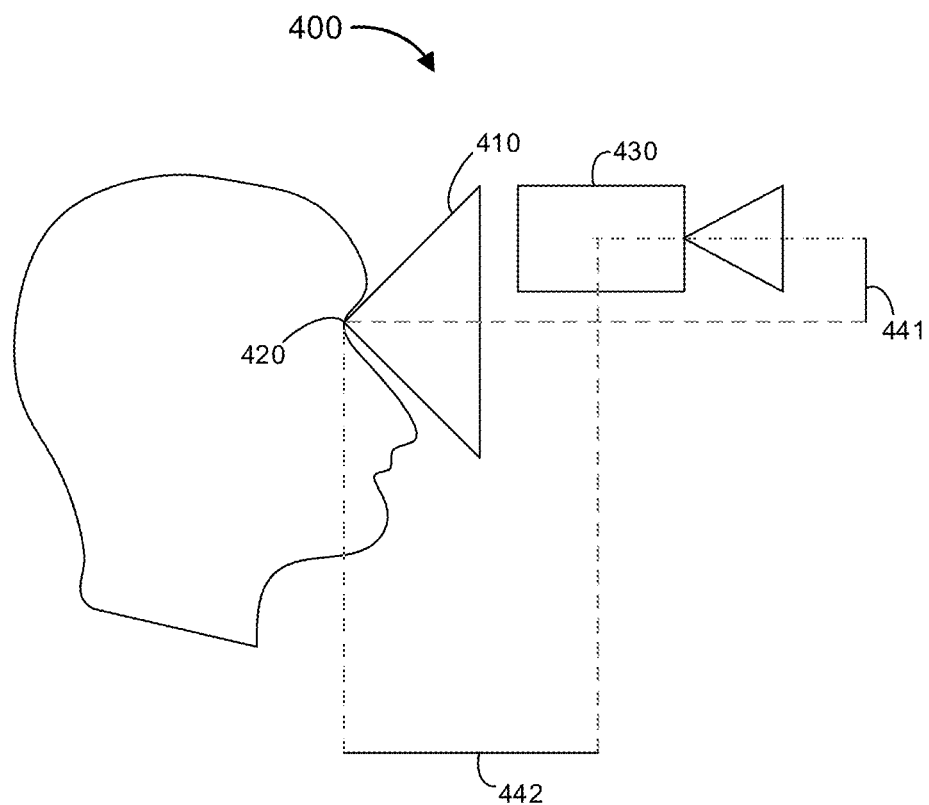
FIG. 4 illustrates an example scenario related to capturing a scene image and displaying the captured scene image in accordance with some implementations.

FIG. 4 illustrates an example scenario 400 related to capturing a scene image and displaying the captured scene image in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, a user wears a device (e.g., the HMD 120 in FIG. 3) including a display 410 and a scene camera 430. The scene camera 430 captures an image of a scene (e.g., a picture of the environment in which the user is present) and the display 410 displays the image of the scene to the eyes 420 of the user. The scene camera 430 has a point-of-view (e.g., where the image sensor of the scene camera 430 is located) that can be offset vertically from the point-of-view of the user (e.g., where the eyes 420 of the user are located) by a vertical offset 441. Further, the point-of-view of the scene camera 430 is offset horizontally from the point-of-view of the user by a horizontal offset 442.

Figure 5A:
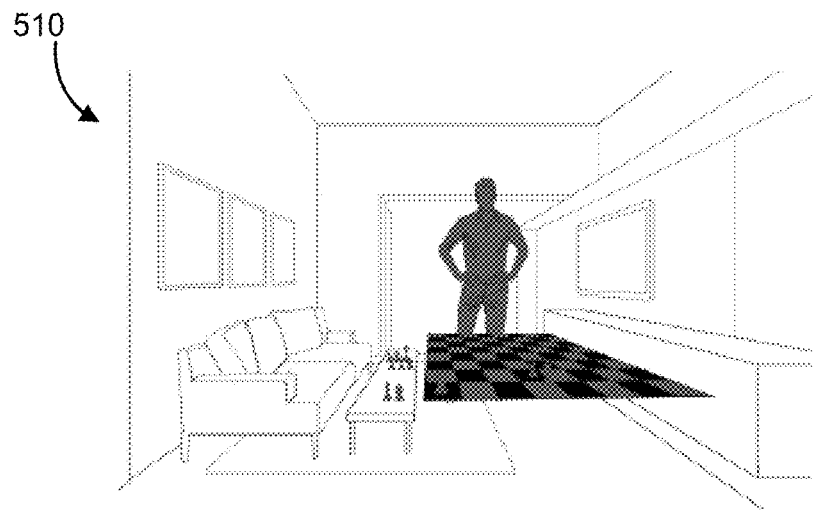
FIG. 5A illustrates an example scene that would be perceived by a user at a point-of-view of the user in the absence of an HMD.
Figure 5B:
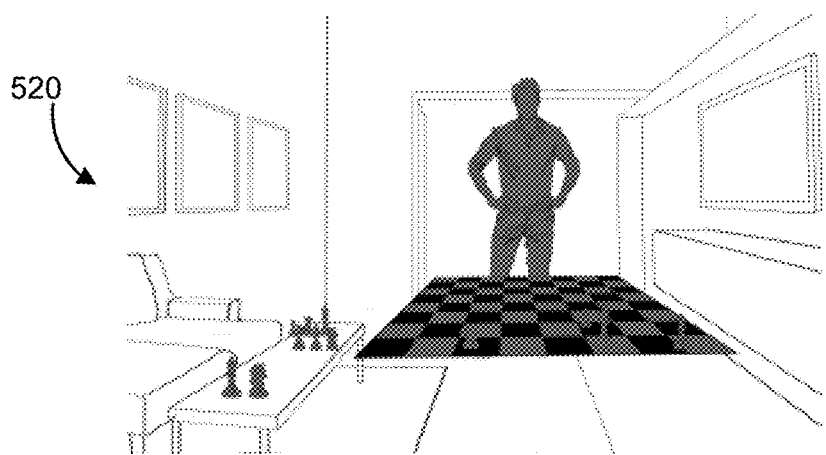
FIG. 5B illustrates an example image of the scene of FIG. 5A captured by a scene camera having a point-of-view at a different location than the point-of-view of the user.

FIG. 5A illustrates an example scene 510 that would be perceived by a user at a point-of-view of the user in the absence of an HMD (e.g., the user not wearing the HMD). FIG. 5B illustrates an example image of the scene 520 captured by a scene camera having a point-of-view at a different location than the point-of-view of the user. In comparing the image of the scene 520 with the scene 510, it can be noted that the objects in the scene 510 as presented in the image of the scene 520 appear closer due to the horizontal offset of the point-of-view of the scene camera. Further, objects in the scene 510 as presented in the image of the scene 520 appear lower (even to the extent that objects at the bottom of the scene 510 are not captured in the image of the scene 520) due to the vertical offset of the point-of-view of the scene camera.

Figure 5C:
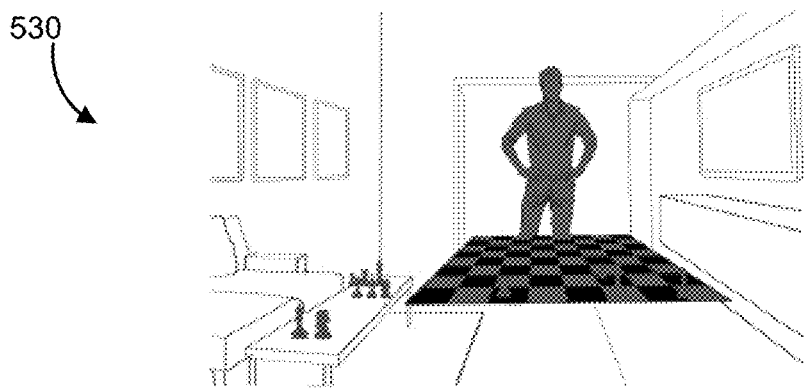
FIG. 5C illustrates an example transformed image of the scene of FIG. 5A generated by applying a homographic transformation to the image of the scene of FIG. 5B.

FIG. 5C illustrates an example transformed image of the scene 530 generated by applying a homographic transformation to the image of the scene 520. In comparing the transformed image of the scene 530 with the scene 510, it can be noted that the objects in the scene 510 as presented in the transformed image of the scene 530 appear at the same height and distance as the scene 510. However, the transformed image of the scene 530 is missing information at the edges of image. In various implementations, missing areas at the edges are reduced by increasing the field-of-view of the scene camera. Accordingly, in various implementations, the field-of-view of the scene camera is greater than a field-of-view of the user. For example, in some implementations, the scene camera includes a fisheye lens or other optics to increase the field-of-view.

Figure 6:
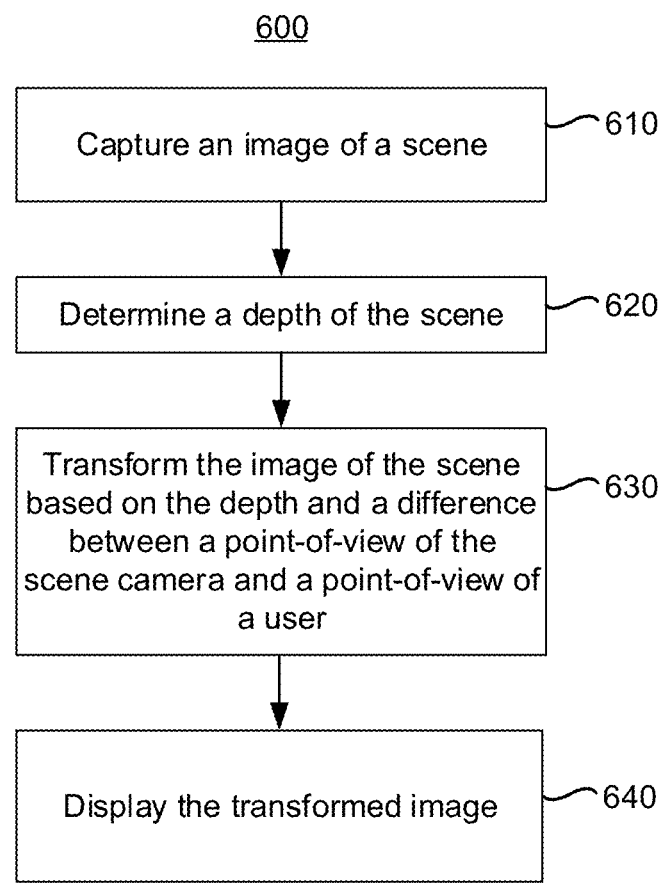
FIG. 6 is a flowchart representation of a method of scene camera retargeting in accordance with some implementations.

FIG. 6 is a flowchart representation of a method 600 of scene camera retargeting in accordance with some implementations. In various implementations, the method 600 is performed by a device with one or more processors, non-transitory memory, a scene camera, and one or more MR displays (e.g., the HMD 120 FIG. 3). In some implementations, the method 600 is performed by processing logic, including hardware, firmware, software, or a combination thereof. In some implementations, the method 600 is performed by a processor executing instructions (e.g., code) stored in a non-transitory computer-readable medium (e.g., a memory). Briefly, in some circumstances, the method 600 includes: capturing an image of a scene and determining a depth of the scene, transforming the image of the scene based on the depth, and displaying the transformed image.

The method 600 begins, in block 610, with the device capturing, using the scene camera, an image of a scene. Thus, the device captures an image of the environment of a user of the device.

The method 600 continues, at block 620, with the device determining a depth of the scene. In various implementations, the device determines the depth in various ways (which may be used alone or in combination). In some implementations, the device determines a plurality of pixel depths corresponding to a plurality of pixels of the image of the scene. The pixel depths are indicative of the distance between the device and an object (or a portion thereof) represented by the corresponding pixel. In various implementations, the pixel depths are determined using scene understanding, VIO (visual inertial odometry), a depth sensor, and/or depth by stereo.

In various implementation, the device determines a single depth. In various implementations, the device determines a first and second depth for the user's first and second eyes, respectively. In such implementations, the device reconciles the first and second depths in order to determine the depth of the scene. For example, in some implementations, the device averages the first and second depths in order to determine the depth of the scene.

Figure 7:
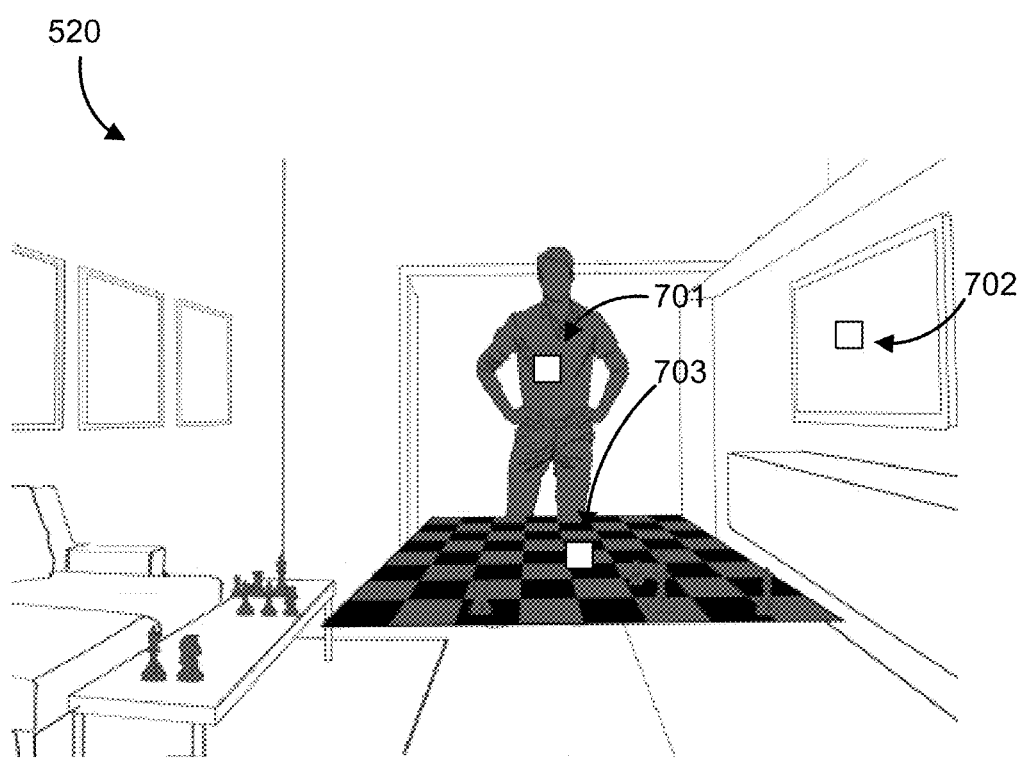
FIG. 7 illustrates the image of the scene of FIG. 5B with certain pixels highlighted.

In various implementations, the device determines the depth of the scene as one of the plurality of pixel depths corresponding to one of the plurality of pixels of the image at a center of the image. FIG. 7 illustrates the image of the scene 520 of FIG. 5B with certain pixels highlighted. In FIG. 7, the pixel at the center of the image 701 represents a person. Thus, the depth of the scene is selected as the distance between the device and the person. In this way, the device determines the depth of the scene as the distance between the device and an object the device is facing.

In various implementations, the device determines the depth of the scene as one of the plurality of pixel depths corresponding to one of the plurality of pixels of the image at a fixation point of the user in the image. In various implementations, the device includes an eye tracker (e.g., an inward facing camera and appropriate processing modules) that determines the fixation point of the user. In FIG. 7, the pixel at the fixation point of the user in the image 702 represents a television. Thus, the depth of the scene is selected as the distance between the device and the television. In this way, the device determines the depth of the scene as the distance between the device and an object the user is looking at (e.g., an object that has focus).

In various implementations, the device determines the depth of the scene as the most frequent pixel depth among the plurality of pixel depths. For example, the device can generate a depth histogram of the pixel depths and select, as the depth, the bin of the depth histogram that represents the most pixels.

In various implementations, the device determines the depth based in part on a task being performed by the user. For example, in various implementations, in response to determining that the user is performing different tasks, such as sitting at a desk, sitting on a couch, walking around, or interacting (e.g., talking) with other people, the device can determine different depths and/or determine the depth using different heuristics. As an example, in various implementations, when the user is interacting with close objects (e.g., those less than 2 meters away), the depth is slightly greater than the distance to the object (e.g., 110% of the distance to the object), whereas when the user is interacting with objects further away (e.g., those more than 2 meters away), the depth is approximately the same as the distance to the object.

In FIG. 7, the salient pixel 703 represents a game board. Thus, the depth of the scene is selected as the distance between the device and the center of the game board. In this way, the device determines the depth of the scene as the distance between the device and a salient object in the scene. Thus, in various implementations, the device determines the depth of the scene based on the content of the scene.

In various circumstances, the task is associated with an amount of movement of the user. For example, for a game including a static game board, the amount of movement may be small, whereas for an outdoor scavenger hunt game, the amount of movement may be large. In various implementations, the device determines the depth in proportion to the amount of movement, where a larger depth is selected when the amount of movement is larger. In various implementations, the device determines the amount of movement by tracking the body of the user or portions thereof using, e.g., accelerometers. In various implementations, the device predicts the amount of movement based on the application being executed by the device.

In various circumstances, the task is associated with an amount of eye movement of the user. For example, for a game including a game board with many moving pieces, the amount of eye movement may be large, whereas for an augmented reality movie watching application, the amount of eye movement may be small. In various implementations, the device determined the depth in proportion to the amount of eye movement, where a larger depth is selected when the amount of movement is larger. In various implementations, the device determines the amount of eye movement by tracking the gaze and/or fixation point of the user or portions thereof using, e.g., an eye tracker. In various implementations, the device predicts the amount of eye movement based on the application being executed by the device.

Accordingly, in various implementations, the device determines the depth based on behavior of the user (e.g., moving eyes or body). And, in various implementations, the device determines the depth based in part on the application being executed by the device. In particular, the device determines the depth based on a task associated with the application being executed by the device.

The method 600 continues, at block 630, with the device transforming the image of the scene based on the depth and a difference between a point-of-view of the scene camera and a point-of-view of a user. In various implementations, the device transforms the image of the scene at an image pixel level, an image tile level, or a combination thereof.

In various implementations, the transformation is a homographic transformation. Thus, in various implementations, for each pixel of the image of the scene at a pixel location in an untransformed space, a new pixel location is determined in a transformed space.

In various implementations, the new pixel location is determined according to the following equation in which $x_c$ and $y_c$ are the pixel location in the untransformed space, $x_t$ and $y_t$ are the pixel location in the transformed space, $P_{eye}$ is a 3×3 view projection matrix of the eye representing the point-of-view of the user, $P_{cam}$ is a 3×3 view projection matrix of the scene camera representing the point-of-view of the scene camera, d is the depth of the scene determined by the device, and d' is an unused transformed depth:

$$\begin{bmatrix} x_t \\ y_t \\ d' \end{bmatrix} = P_{eye} \cdot P_{cam}^{-1} \cdot \begin{bmatrix} x_c \\ y_c \\ d \end{bmatrix}$$

Whereas, in various implementations, d is constant across pixel locations, in various implementations, d is a function of the pixel locations (e.g., a linear function). Thus, the planar world assumption may assume a tilted plane or curved plane. In various implementations, d is a function of a single depth of the scene determined by the device. In various implementations, d is a function of multiple depths of the scene determined by the device (e.g., at different pixel locations).

In various implementations, the new pixel location is determined using the above equation for each pixel in the image of the scene. In various implementations, the new pixel location is determined using the above equation for less than each pixel of the image of the scene (e.g., for the four corners of the image of the scene with linear interpolation applied to determine other new pixel locations).

In various implementations, the device determines the view projection matrix of the eye and the view projection matrix of the scene camera during a calibration and stores data indicative of the view projection matrices (or their product) in a non-transitory memory. The product of the view projection matrices is a transformation matrix represents a difference between the point-of-view of the scene camera and the point-of-view of the user.

Thus, in various implementations, transforming the image of the scene includes determining, for a pixel having a pixel location, a new pixel location by multiplying a vector including the pixel location and the depth by a transformation matrix representing a difference between the point-of-view of the scene camera and the point-of-view of the user.

Using the new pixel locations in the transformed space and the pixel values of the pixels of the image of the scene, the device generates a transformed image using interpolation or other techniques.

The method 600 continues, at block 640, with the device displaying, on the display, the transformed image. In various implementations, the transformed image includes AR content. In some implementations, AR content is added to the image of the scene before the transformation (at block 630). In some implementations, AR content is added to the transformed image. In various implementations, the device determines whether to add the AR content to the image of the scene before or after the transformation based on metadata indicative of the AR content's attachment to the scene. In various implementations, the device determines whether to add the AR content to the image of the scene before or after the transformation based on an amount of AR content (e.g., a percentage of the image of the scene containing AR content). In various implementations, a remote device (e.g., not the HMD) provides the HMD with some or all of the AR content.

In various implementations, the device determines whether to add the AR content to the image of the scene before or after the transformation based on metadata indicative of a depth of the AR content.

Accordingly, in various implementations, the method 600 includes receiving AR content and AR content metadata, selecting the image of the scene or the transformed image based on the AR content metadata, and adding the AR content to selection.

In various implementations, the method 600 repeats at various times. For example, the method 600 can be performed continuously. As another example, the method 600 can be performed periodically or intermittently. However, using some of the ways of determining the depth of the scene described above in such a context can lead to an undesirable "popping" effect when the depth of the scene changes too rapidly. In various implementations, the plurality of pixel depths are spatially filtered (e.g., using a lowpass filter) to reduce such an effect. Accordingly, in various implementations, determining the plurality of pixel depths includes filtering a plurality of raw pixel depths corresponding to the plurality of pixels in the image.

In various implementations, the depth of the scene is temporally filtered such that the depth of the scene can only change up to a preset amount at each performance of the method 600. In various implementations, the depth of the scene is changed when a user blinks or performs a saccade (or other rapid eye movement). In various implementations, the depth of the scene is changed while the user is focused on an object (e.g., during a static fixation). In various implementations, the depth of the scene is changed when the user moves rather than when motion of objects in the scene cause the determined depth to change.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
at a head-mounted device (HMD) including one or more processors, non-transitory memory, a scene camera, and a display:
capturing, using the scene camera, an image of a scene;
determining, using the one or more processors, a depth of the scene;
transforming, using the one or more processors, the image of the scene based on the depth and a difference between a point-of-view of the scene camera and a point-of-view of a user; and
displaying, on the display, the transformed image.

2. The method of claim 1, wherein determining the depth includes determining a plurality of pixel depths corresponding to a plurality of pixels of the image.

3. The method of claim 2, wherein the depth of the scene is based on one of the plurality of pixel depths corresponding to one of the plurality of pixels of the image at a center of the image.

4. The method of claim 2, wherein the depth of the scene is based on one of the plurality of pixel depths corresponding to one of the plurality of pixels of the image at a fixation point of the user in the image.

5. The method of claim 2, wherein the depth of the scene is based on the most frequent pixel depth among the plurality of pixel depths.

6. The method of claim 2, wherein determining the plurality of pixel depths includes filtering a plurality of raw pixel depths corresponding to the plurality of pixels in the image.

7. The method of claim 1, wherein determining the depth is based in part on a task being performed by the user.

8. The method of claim 1, wherein determining the depth is based in part on a behavior of the user.

9. The method of claim 1, wherein transforming the image of the scene includes determining, for a pixel having a pixel location, a new pixel location by multiplying a vector including the pixel location and the depth by a transformation matrix representing a difference between the point-of-view of the scene camera and the point-of-view of the user.

10. The method of claim 1, further comprising:
receiving AR content and AR content metadata;
selecting the image of the scene or the transformed image based on the AR content metadata; and
adding the AR content to the selected image.

11. The method of claim 1, further comprising changing the depth of the scene in response to determining the user has blinked or performed a saccade.

12. A device comprising:
a scene camera;
a display; and
one or more processors to:
capture, using the scene camera, an image of a scene;
determine a depth of the scene;
transform the image of the scene based on the depth and a difference between a point-of-view of the scene camera and a point-of-view of a user; and
display, on the display, the transformed image.

13. The device of claim 12, wherein the one or more processors are to determine the depth by determining a plurality of pixel depths corresponding to a plurality of pixels of the image.

14. The device of claim 13, wherein the depth of the scene is based on one of the plurality of pixel depths corresponding to one of the plurality of pixels of the image at a center of the image.

15. The device of claim 13, wherein the depth of the scene is based on one of the plurality of pixel depths corresponding to one of the plurality of pixels of the image at a fixation point of the user in the image.

16. The device of claim 13, wherein the depth of the scene is based on the most frequent pixel depth among the plurality of pixel depths.

17. The device of claim 12, wherein the one or more processors are to transform the image of the scene by determining, for a pixel having a pixel location, a new pixel location by multiplying a vector including the pixel location and the depth by a transformation matrix representing a difference between the point-of-view of the scene camera and the point-of-view of the user.

18. A non-transitory computer-readable medium having instructions encoded thereon which, when executed by one or more processors of a device including a scene camera and a display, cause the device to:
capturing, using the scene camera, an image of a scene;
determine a depth of the scene;
transform the image of the scene based on the depth and a difference between a point-of-view of the scene camera and a point-of-view of a user; and
display, on the display, the transformed image.

19. The non-transitory computer-readable medium of claim 18, wherein the instructions cause the device to determine the depth by determining a plurality of pixel depths corresponding to a plurality of pixels of the image, wherein the depth of the scene is based on one of the plurality of pixel depths corresponding to one of the plurality of pixels of the image at a fixation point of the user in the image.

20. The non-transitory computer-readable medium of claim 18, wherein the instructions cause the device to transform the image of the scene by determining, for a pixel having a pixel location, a new pixel location by multiplying a vector including the pixel location and the depth by a transformation matrix representing a difference between the point-of-view of the scene camera and the point-of-view of the user.

* * * * *